US012699520B2

(12) United States Patent
Genshaft et al.

(10) Patent No.: US 12,699,520 B2
(45) Date of Patent: Aug. 4, 2026

(54) IRREGULAR JUMBO BLOCK SIZE UNIFICATION

(71) Applicant: Sandisk Technologies, Inc., Milpitas, CA (US)

(72) Inventors: Igor Genshaft, Bat Yam (IL); Vered Kelner, Gan Haim, IL (US); Marina Frid, Jerusalem (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/361,642

(22) Filed: Jul. 28, 2023

(65) Prior Publication Data

US 2024/0319898 A1    Sep. 26, 2024

Related U.S. Application Data

(60) Provisional application No. 63/491,119, filed on Mar. 20, 2023.

(51) Int. Cl.
G06F 3/06            (2006.01)

(52) U.S. Cl.
CPC .............. G06F 3/064 (2013.01); G06F 3/061 (2013.01); G06F 3/0631 (2013.01); G06F 3/0679 (2013.01)

(58) Field of Classification Search
CPC ........ G06F 3/064; G06F 3/061; G06F 3/0631; G06F 3/0679
See application file for complete search history.

(56) References Cited

U.S. PATENT DOCUMENTS

| | | | |
|---|---|---|---|
| 8,117,381 | B2 | 2/2012 | Gonzalez et al. |
| 8,700,961 | B2 | 4/2014 | Lassa et al. |
| 9,626,312 | B2 | 4/2017 | Frid et al. |
| 10,649,661 | B2 | 5/2020 | Bennett et al. |
| 2020/0363955 | A1* | 11/2020 | Ji .......................... G06F 3/0688 |
| 2020/0401328 | A1 | 12/2020 | Lee |
| 2021/0365200 | A1* | 11/2021 | Alwala ................. G06F 3/0604 |
| 2022/0269441 | A1* | 8/2022 | Kim ....................... G11C 29/76 |
| 2022/0404966 | A1* | 12/2022 | Kanno ................... G06F 3/0619 |
| 2023/0195341 | A1* | 6/2023 | Muchherla ............ G06F 3/0659 |
| | | | 711/154 |
| 2024/0272816 | A1* | 8/2024 | Choe ....................... G06F 3/061 |

* cited by examiner

*Primary Examiner* — Rocio Del Mar Perez-Velez
*Assistant Examiner* — Jonah C Krieger
(74) *Attorney, Agent, or Firm* — Patterson + Sheridan, LLP

(57) ABSTRACT

The present disclosure generally relates to improved performance for jumbo blocks (JBs) with a low die count. Rather than variable performance for each irregular jumbo block (IRJB), the same performance can be achieved with all IRJBs. Using an IRJB size unification process relinking the die blocks from relatively rich (i.e., large) IRJBs with the die blocks of the poor (i.e., small) IRJBs occurs in a die table. The relink blocks are moved to IRJBs that have missing die blocks in the same die where the die blocks were taken from. In so doing, the IRJBs in the die table are of the same size.

19 Claims, 8 Drawing Sheets

200

Dies (sorted by size)

JBID 0

JBID 1

⠿

Regular JBs of size 12 dies 1 2 3 4 5 6

1 2 3 4 5 6

1 2 3 4 5 6

1 2 3 4 5 6

Irregular JBs of various sizes from 1 to 11 dies 1 2 3 4 5

1 2 3

JBID N-1   1

300

Dies (sorted by size)

JBID 0

JBID 1

JBID N-1

Irregular JBs of the same size, 6 dies each

500

Ignoring the smallest IRJBs will lead to increasing the Unified IRJB size

IRJBs 2 smallest IRJBs are excluded in order to obtain 5 IRJBs with size 8 (instead of 7 IRJBs with size 6)

Die-blocks from the excluded IRJBs can be given to FS or another consumer

IRREGULAR JUMBO BLOCK SIZE UNIFICATION

CROSS-REFERENCE TO RELATED APPLICATIONS

This application claims benefit of U.S. Provisional Patent Application Ser. No. 63/491,119, filed Mar. 20, 2023, which is herein incorporated by reference.

BACKGROUND OF THE DISCLOSURE

Field of the Disclosure

Embodiments of the present disclosure generally relates to improved jumbo block (JB) performance.

Description of the Related Art

Combining and an entire line of physical die blocks forms an entity a called jumbo block (JB). JBs contain physical die blocks from each physical die. Bad blocks may be present in a die. The physical die blocks can be described by a bitmap per JB, which is a single bit per die-block. Regular jumbo blocks (RJB) will have all 1s, but will actually not have a bitmap. Irregular jumbo blocks (IRJB) have certain die-blocks that are missing from the physical dies (mainly because the physical die blocks are bad). IRJBs will have 0s in positions corresponding to bad die-blocks and 1s in the rest of the physical die block positions described by the bitmap. IRJBs are smaller than the RJBs.

All bad die-blocks in the middle of each die with the good blocks at the end of the physical die will be relocated to the end of each die. Physically bad blocks can be anywhere in the die, but logically the bad blocks will be at the end of the die. Using relinking via a bad block management (BBM) table on the device format, the bad blocks will move to the end of the die-blocks and be substituted with relinked die-blocks. The substitution is done using the same relink table that is used in runtime for replacing the bad die-blocks. After the relinking, the dies will have all bad blocks at the end of the die. Any reference to the substituted bad blocks will be readdressed to the good blocks (ones taken from the end of the die) through the relink table. In result of this process, all IRJBs will be located after all RJBs.

Generally, for IRJBs, a missed physical block in an IRJB is replaced with one taken from another die of another IRJB. Such an approach potentially can be extended for utilizing all the IRJBs, but the level of the die parallelism of the IRJBs will be limited to half of the die parallelism of the RJBs (because of the repeating dies in the same IRJB).

IRJBs can be used, but the bigger the JB number, the shorter the JB is. For example, in a large IRJB, if there is only one die block, then the one die block is too short to efficiently be written. The short die block has multiple missing dies. Any read or writes of a JB can be performed simultaneously on all the dies, but with the one die in the IRJB will make the read or writes extremely inefficient.

Therefore, there is a need in the art for improved performance for JBs with a low die count.

SUMMARY OF THE DISCLOSURE

The present disclosure generally relates to improved performance for jumbo blocks (JBs) with a low die count. Rather than variable performance for each irregular jumbo block (IRJB), the same performance can be achieved with all IRJBs. Using an IRJB size unification process relinking the die blocks from relatively rich (i.e., large) IRJBs with the die blocks of the poor (i.e., small) IRJBs occurs in a die table. The relink blocks are moved to IRJBs that have missing die blocks in the same die where the die blocks were taken from. In so doing, the IRJBs in the die table are of the same size.

In one embodiment, a data storage device comprises a memory device; and a controller coupled to the memory device, wherein the controller is configured to: create a plurality of jumbo blocks, wherein the plurality of jumbo includes plurality of irregular jumbo blocks, and wherein an irregular jumbo block includes a block from less than all dies of the memory device; and relink at least one block from a first irregular jumbo block of the plurality of irregular jumbo blocks to a second irregular jumbo block of the plurality of jumbo blocks, wherein after the relinking the first irregular jumbo block and the second irregular jumbo block include a same number of dies.

In another embodiment, a data storage device comprises a memory device; and a controller coupled to the memory device, wherein the controller is configured to: create a plurality of jumbo blocks, wherein the plurality of jumbo blocks comprises at least one regular jumbo block and a plurality of irregular jumbo blocks, wherein an irregular jumbo block includes a block from less than all dies of the memory device, and wherein a regular jumbo block includes a block from all dies of the memory device; and relink at least one block from a first regular jumbo block of the at least one regular jumbo blocks to a first irregular jumbo block of the plurality of irregular jumbo blocks, wherein after the relinking the first regular jumbo block becomes a second irregular jumbo block, and wherein the first irregular jumbo block and the second irregular jumbo block include a same number of dies.

In another embodiment, a data storage device comprises means to store data; and a controller coupled to the means to store data, wherein the controller is configured to: create a plurality of jumbo blocks, wherein the plurality of jumbo blocks includes at least one regular jumbo block and a plurality of irregular jumbo blocks, wherein an irregular jumbo block includes a block from less than all dies of the means to store data, and wherein a regular jumbo block includes a block from all dies of the means to store data; eliminate at least one irregular jumbo block of the plurality of irregular jumbo blocks from the plurality of jumbo blocks; and relink at least one block from one or more of the following to a remaining plurality of irregular jumbo blocks to create a new plurality of irregular jumbo blocks: the eliminated at least one irregular jumbo block; the at least one regular jumbo block; and the remaining plurality of irregular jumbo blocks, wherein after relinking the new plurality of irregular jumbo blocks all include a same number of dies.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved performance for jumbo blocks (JBs) with a low die count. Rather than variable performance for each irregular jumbo block (IRJB), the same performance can be achieved with all IRJBs. Using an IRJB size unification process relinking the die blocks from relatively rich (i.e., large) IRJBs with the die blocks of the poor (i.e., small) IRJBs occurs in a die table. The relink blocks are moved to IRJBs that have missing die blocks in the same die where the die blocks were taken from. In so doing, the IRJBs in the die table are of the same size.

Figure 1:
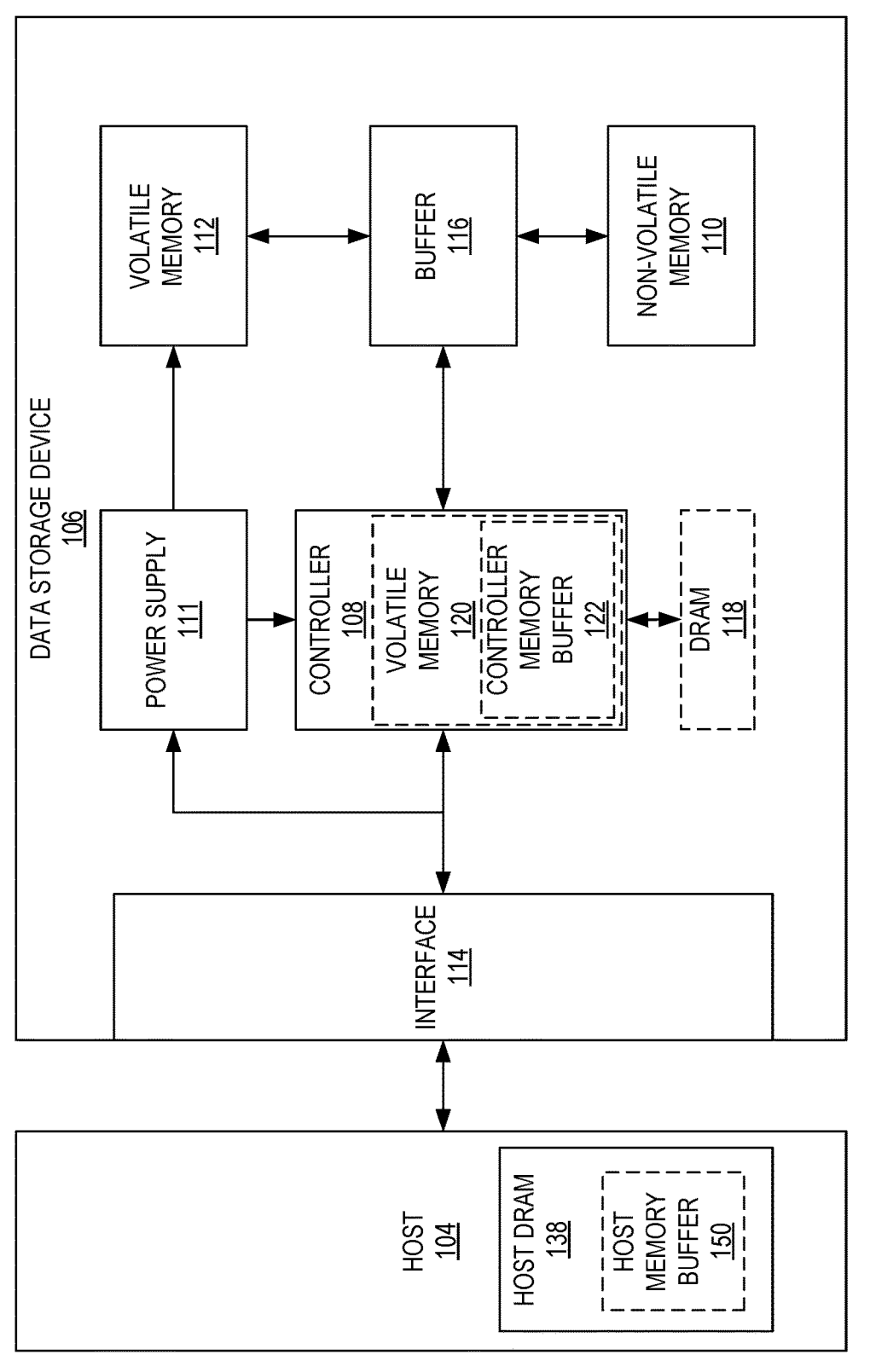
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
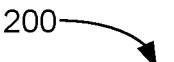
FIG. 2 shows an example of a die table of RJBs and IRJBs, according to an exemplary embodiment.

FIG. 2 shows an example of a die table 200 of RJBs and IRJBs, according to an exemplary embodiment. For decreasing the mapping size, NAND-based storage devices combine separate physical blocks from different dies into JBs. A JB number consists of physical blocks numbers N taken from each die that allows operating as a single entity in a flash transition layer (FTL). Due to uneven bad block distribution between the dies, the last JBs won't contain physical blocks from all the dies. Such JBs are called IRJB, unlike RJB containing physical blocks from all the dies. The less amount of dies an IRJB contains, the less parallel the writing be compared to the sequential reading from the IRJB. The unparalleled writing and reading of the IRJBS factors, limits utilizing the smallest IRJBs that are less than a certain threshold, which leads to parts of the smallest IRJBs unused in the FTL, although such IRJBs exist in the NAND package. In FIG. 2, there are 12 dies shown as an example. It is to be understood that the JB may comprise more or less dies.

As discussed herein, physical blocks from rich IRJBs can be given to poor IRJBs that have missing physical blocks in the same die where the block was taken from. As a result, all IRJBs will have the same intermediate size that is less than the RJB size. Statistically, the size of the IRJBs will be about one half the size of the RJBs and therefore the IRJB performance will also be about one half of the performance of RJBs. However, both can be increased by involving a few of the RJBs into the size unification process.

Figure 3:
FIG. 3 shows an example of a die table during IRJB size unification, according to an exemplary embodiment.

FIG. 3 shows an example of a die table 300 during IRJB size unification, according to an exemplary embodiment. FIG. 3 shows the IRJB size unification process. There are N−1 JBs in FIG. 3. The last JB, JB identification (JBID) N−1 has only one block and there are numerous other JBs that have less dies than the twelve blocks shown in the RJBs. There are seven IRJBs shown. In the result of the unification, the seven IRJBs of various sizes between one to eleven dies have been converted to dies with a unified size of six dies. More specifically, five blocks from five different dies have been added to JBID N−1 to create IRJB N−1 having six blocks. Similarly, three blocks from three different dies have been added to JBID N−2. One block has been added to JBID N−3. One block has been donated from JBID N−4. Two blocks have been donated from JBID N−5. Three blocks have been donated from each of JBID N−6 and JBID N−7. In so doing, the resulting IRJBs all have the same number of blocks, and the IRJBs have one common die for the source of one block for each IRJB. However, the remaining five blocks for the IRJBs are not necessarily from the same dies. More specifically, the IRJBs that donate blocks have blocks from the same dies in the example shown in FIG. 3, and the IRJBs that receive donated blocks have blocks from different dies. It is to be understood that ultimately, any blocks can be donated from the donation IRJBs so long as all of the resulting IRJBs have only one block from any die.

The extra physical blocks marked with the crosses "X", could be potentially remained in their IRJBs increasing their size, with losing the strict size unification property (i.e., the IRJBs will have some different size >=6 dies). Alternatively, the extra physical blocks marked with the crosses "X" be used for other purposes than JBs. Furthermore, the physical blocks with the crosses (whose amount won't exceed the number of IRJBs) are not used because they will lead to unequal IRJB sizes.

Figure 4:
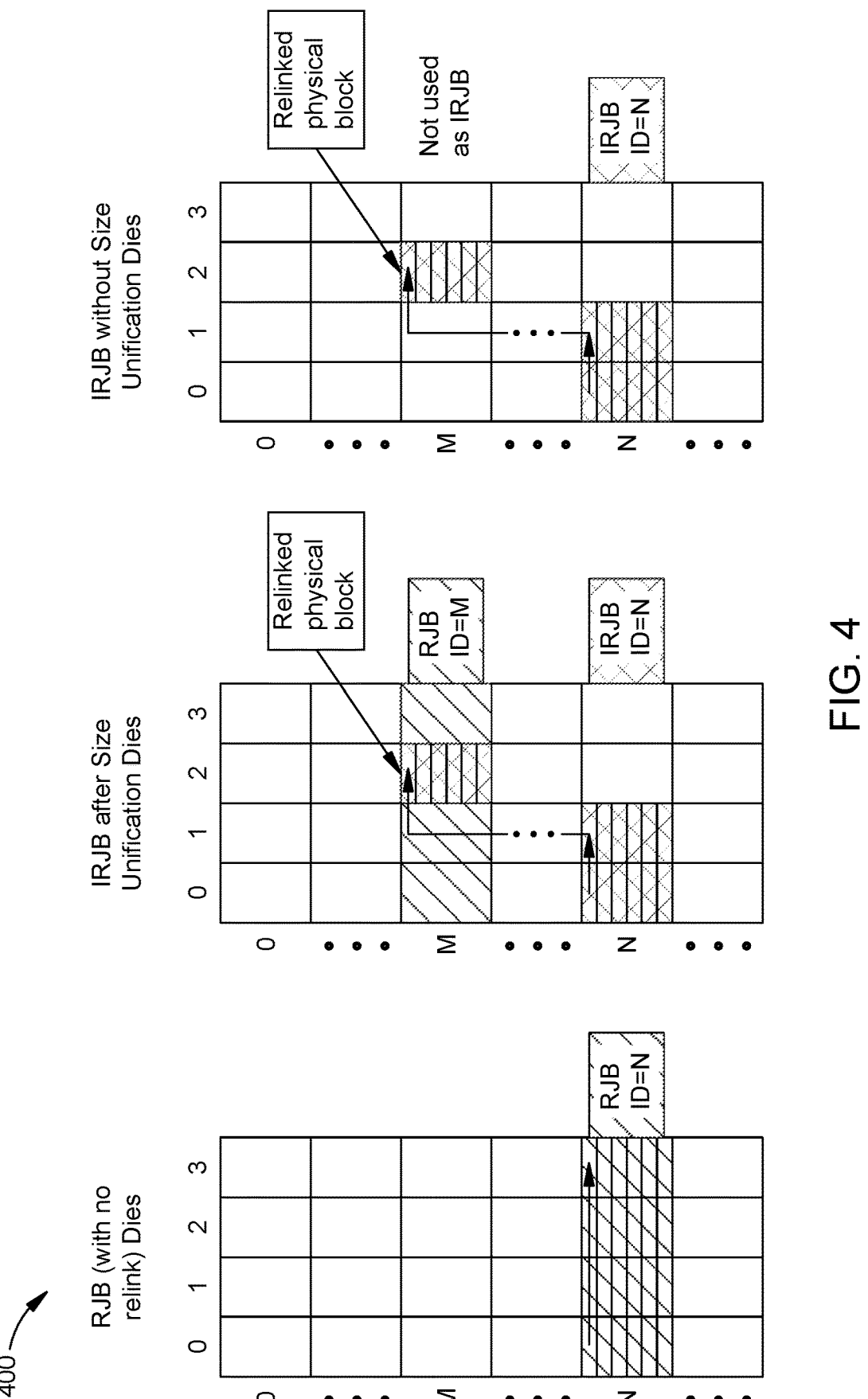
FIG. 4 shows an example of the difference in IRJB size unification in a die table, according to an exemplary embodiment.

FIG. 4 shows an example of the difference in IRJB size unification in a die table 400, according to an exemplary embodiment. The difference in writing patterns between RJB, IRJB after size unification and IRJB without size unification but with a physical block relink is shown in FIG. 4. Size unification begins with writing any data to the device until all or almost all JBs are allocated and partially written. Every time a new JB is allocated, the physical block IDs and on which dies are written for the JB must be monitored. For a RJB the ID=N without bad block substitutions. Word-line (WL) ID=0 on physical block ID=N on die ID=0 will be written first. After the write will move to the same WL on the same physical block ID on die ID=1 etc. for all existing dies. When WLs with ID=0 on all the dies are written, the write will move to WL ID=1 etc. In the case that the IRJB size unification has been used on the device, when an IRJB is being written, the following pattern will take place for a part of the IRJBs. For certain JBs, switching to WL ID=1 will be performed, although not all existing physical blocks ID=N in various dies were written (some of them were skipped). Skipping physical blocks will happen to the rich IRJBs because the rich IRJBs donate part of their physical blocks to the poor IRJBs. For other JBs, jumping to different physical block ID=M (other than N) on the same die will happen when the physical block ID=N on this die is bad. The physical block ID=M where the write has jumped to is one donated by a rich IRJB ID=M to the currently written poor IRJB ID=N. It is to be understood that jumping to different physical block ID=M on the same block maybe mistaken for a usual bad block manager relinking, but in that case switching to WL ID=1 will not happen for the JB IDs which the replacement physical blocks were taken from.

Figure 5:
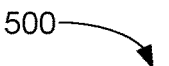
FIG. 5 shows an example of obtaining larger unified IRJB size on account of ignoring smallest IRJBs in a data table, according to an exemplary embodiment.

FIG. 5 shows an example of obtaining larger unified IRJB size on account of ignoring the smallest IRJBs in a data table 500, according to an exemplary embodiment. A few of the smallest jumbo blocks can be excluded from the size unification process in order to obtain larger unified IRJB size without involving the regular block. Possible because the smallest blocks need the most of the die blocks. For example, if two of the smallest IRJBs are excluded in order to obtain five IRJBs, the size of the IRJBs can be increased to eight blocks as shown in FIG. 5 as compared to six blocks as shown in FIG. 3. The die blocks marked with a cross 'X" that are excluded from the IRJBs can be utilized for purposes other than JBs.

Figure 6:
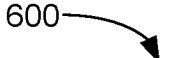
FIG. 6 shows an example of larger unified IRJB size in a data table, according to an exemplary embodiment.
Figure 6:
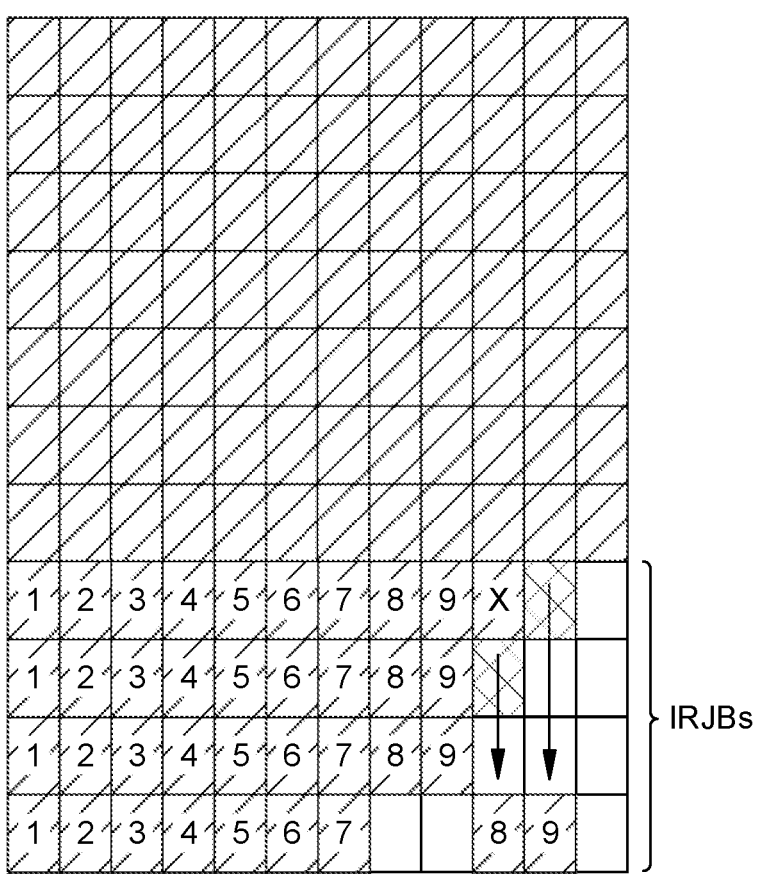

FIG. 6 shows an example of larger unified IRJB size in a data table 600, according to an exemplary embodiment. Once the smallest IRJB's are excluded from the data table 600, IRJB's with the size of nine blocks are able to be obtained. It is to be understood that though the size of the IRJB in this example is nine, the IRJB may be any size based on the excluded IRJB's. As shown in FIG. 6 die blocks (8 and 9) are moved from a rich IRJB to create IRJB's with the size of nine that are equal to the other IRJB's with the size of nine.

It is contemplated that RJBs can be used for donations as well. In so doing, the number of RJBs can be decreased in order to maximize the size of the IRJBs. Furthermore, it is contemplated that all RJBs can donate blocks in order to make all JBs IRJBs of the same size. A mixture of donations from RJBs and IRJBs is also contemplated.

Figure 7:
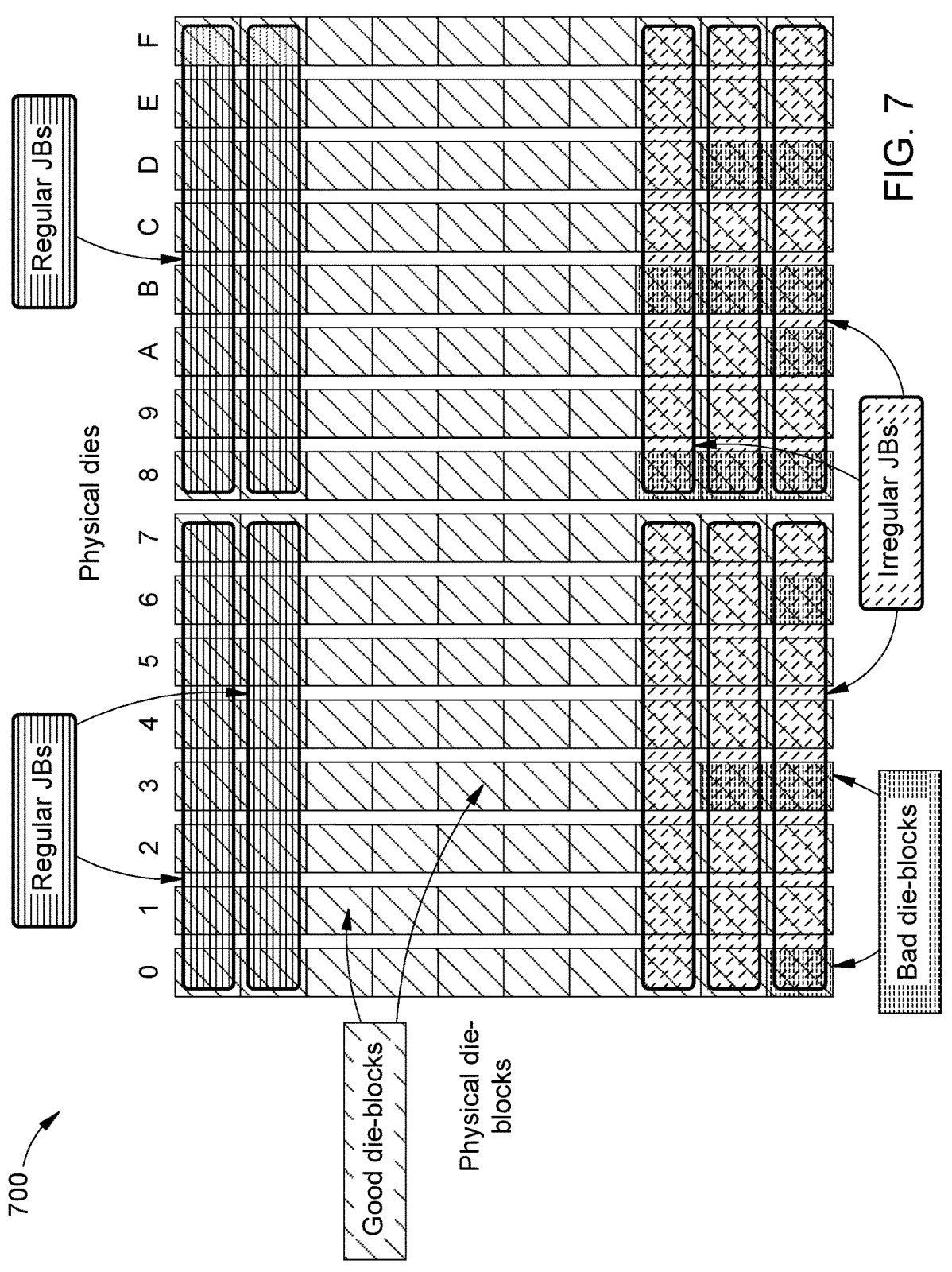
FIG. 7 shows an example of a die table of RJBs and IRJBs, according to an exemplary embodiment.

FIG. 7 shows an example of a die table 700 of RJBs and IRJBs, according to an exemplary embodiment. A device can have a certain number of dies that may be very high, so high in fact that using all of the dies may be unreasonable to form a JB from all dies. In the example of FIG. 7, a device can have 128 dies. Rather than having a sine JB of all 128 dies, while 64 dies are enough for building a JB. In the example of FIG. 7, the die-blocks on the dies 0-63 can be given to one JB, while the dies 64-127 can be given to another JB. In such a scenario, a JB will be treated as an IRJB when bad die-blocks are present within the dies 0-63 or 64-127 correspondingly. More specifically, if die 27 has a bad block and all other dies were fine, then the JB of dies 0-62 would be an IRJB and the JB of dies 64-127 would be a RJB. Similarly, a device with yet more physical dies can divide the physical dies between more JBs, such as 0-63, 64-127, 128-191 and 192-256. Die table 700 shows examples of dividing physical dies between more JBs.

Figure 8:
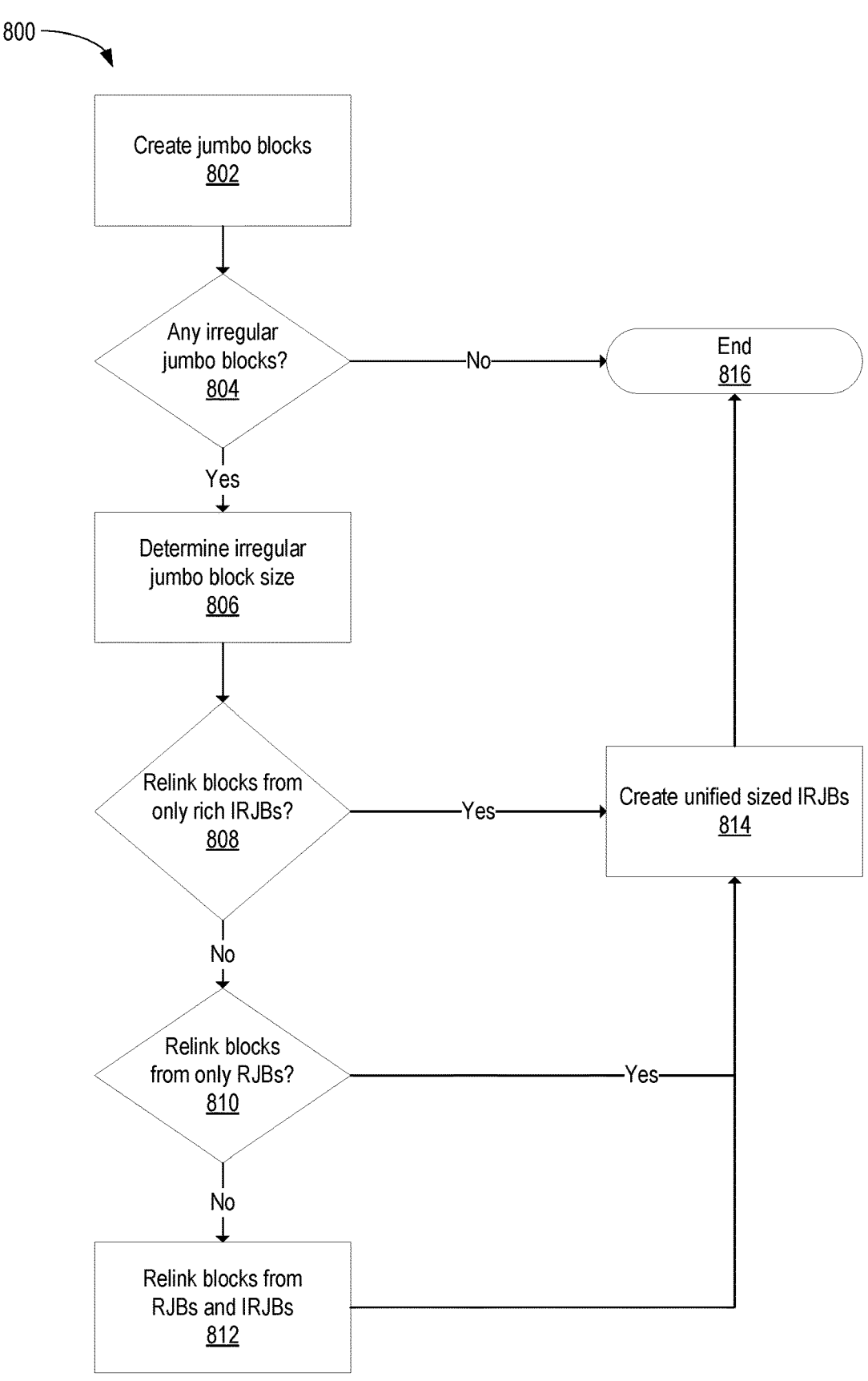
FIG. 8 is a flow chart illustrating a method for creating unified IRJBs, according to certain embodiments.

FIG. 8 is a flow chart illustrating a method 800 for creating unified IRJBs, according to certain embodiments. The method 800 begins at block 802. At block 802, the controller such as the controller 108 of FIG. 1 creates JBs. At block 804, the controller determines whether there are any IRJBs. If the controller determines that there are no IRJBs then method 800 ends at block 816. If the controller determines that there are IRJBs then the method 700 proceeds to block 806. At block 806, the controller determines the IRJB size. At block 808, the controller determines whether the relink blocks are from only the rich IRJBs. If the controller determines that the relink blocks are not only from rich IRJBs then the method 800 proceeds to block 810. If the controller determines the relink block to be only from rich IRJBs then the method 800 proceeds to block 814. At block 814, the controller creates unified sized IRJBs and end the method 800 at block 816. At block 810, the controller determines whether the relink block are only from RJBs. If the controller determines the relink blocks are only from RJBs then the method 800 proceeds to block 814. If the controller determines the relink blocks to not only be from RJBs then the method 800 proceeds to block 812. At block 812, the controller relinks blocks from RJBs and IRJBs and proceeds to block 814.

IRJB size unification allows for utilizing the entire NAND space and at the same time keeping reasonable performance of the IRJBs. The achievable performance for IRJBs can be more than half of the RJB performance.

In one embodiment, a data storage device comprises a memory device; and a controller coupled to the memory device, wherein the controller is configured to: create a plurality of jumbo blocks, wherein the plurality of jumbo includes plurality of irregular jumbo blocks, and wherein an irregular jumbo block includes a block from less than all dies of the memory device; and relink at least one block from a first irregular jumbo block of the plurality of irregular jumbo blocks to a second irregular jumbo block of the plurality of jumbo blocks, wherein after the relinking the first irregular jumbo block and the second irregular jumbo block include a same number of dies. The controller is further configured to allocate at least one block from at least one irregular jumbo block of the plurality of irregular jumbo blocks to a use outside of the plurality of jumbo blocks. The at least one block is not a bad block. At least one block from the first irregular jumbo block is from a die that is different from any dies having blocks in the second irregular jumbo block. The controller is further to select the same number of dies prior to the relinking. The selecting is performed to achieve a predetermined irregular jumbo block performance. After relinking there are regular jumbo blocks, the first irregular jumbo block, the second irregular jumbo block, and a third irregular jumbo block, wherein both the regular jumbo block and the third irregular jumbo block have a greater number of dies than the same number of dies. The controller is further configured to: determine that an irregular jumbo block performance is below a threshold; and increase a size of each irregular jumbo block of the plurality of irregular jumbo blocks. The controller is configured to reduce a number of regular jumbo blocks of the plurality of jumbo blocks in response to the determining. The controller is further configured to decrease a number of the plurality of irregular jumbo blocks in response to the determining.

In another embodiment, a data storage device comprises a memory device; and a controller coupled to the memory device, wherein the controller is configured to: create a plurality of jumbo blocks, wherein the plurality of jumbo blocks comprises at least one regular jumbo block and a plurality of irregular jumbo blocks, wherein an irregular jumbo block includes a block from less than all dies of the memory device, and wherein a regular jumbo block includes a block from all dies of the memory device; and relink at least one block from a first regular jumbo block of the at least one regular jumbo blocks to a first irregular jumbo block of the plurality of irregular jumbo blocks, wherein after the relinking the first regular jumbo block becomes a second irregular jumbo block, and wherein the first irregular jumbo block and the second irregular jumbo block include a same number of dies. The controller is further configured to relink at least one block from a third irregular jumbo block of the plurality of irregular jumbo blocks to a fourth irregular jumbo block of the plurality of irregular jumbo blocks. The third irregular jumbo block and the fourth irregular jumbo block include the same number of dies. A number of irregular jumbo blocks remains the same after the relinking. Blocks of the first irregular jumbo block are from at least two different physical rows. A first block of the first irregular jumbo block and a second block from the second irregular jumbo block are from a same physical row of the memory device. All blocks of the first irregular jumbo block are from different physical rows of the memory device.

In another embodiment, a data storage device comprises means to store data; and a controller coupled to the means to store data, wherein the controller is configured to: create a plurality of jumbo blocks, wherein the plurality of jumbo blocks includes at least one regular jumbo block and a plurality of irregular jumbo blocks, wherein an irregular jumbo block includes a block from less than all dies of the means to store data, and wherein a regular jumbo block includes a block from all dies of the means to store data; eliminate at least one irregular jumbo block of the plurality of irregular jumbo blocks from the plurality of jumbo blocks; and relink at least one block from one or more of the following to a remaining plurality of irregular jumbo blocks to create a new plurality of irregular jumbo blocks: the eliminated at least one irregular jumbo block; the at least one regular jumbo block; and the remaining plurality of irregular jumbo blocks, wherein after relinking the new plurality of irregular jumbo blocks all include a same number of dies. A number of the remaining plurality of irregular jumbo blocks is less than a number of the plurality of irregular jumbo blocks. After relinking, a total number of regular jumbo blocks of the plurality of jumbo blocks has decreased.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a memory device; and a controller coupled to the memory device, wherein the controller is configured to:

create a plurality of jumbo blocks, wherein the plurality of jumbo blocks includes at least one regular jumbo block and a plurality of irregular jumbo blocks, and wherein an irregular jumbo block includes a block from less than all dies of the memory device and a regular jumbo block includes a block from all dies of the memory device;

relink at least one block from a first irregular jumbo block of the plurality of irregular jumbo blocks to a second irregular jumbo block of the plurality of jumbo blocks, wherein after the relinking the first irregular jumbo block and the second irregular jumbo block include a first same number of blocks; and relink at least one block from the at least one regular jumbo block and at least one block from the first irregular jumbo block to the second irregular jumbo block, wherein:

after the relinking of the at least one block from the at least one regular jumbo block and the first irregular jumbo block:

the second irregular jumbo block comprises at least one block relinked from the regular jumbo block and the first irregular jumbo block;

the at least one regular jumbo block, the first irregular jumbo block, and the second irregular jumbo block include a second same number of blocks; and a size of each irregular jumbo block of the plurality of irregular jumbo blocks is increased.

2. The data storage device of claim 1, wherein the controller is further configured to allocate at least one block from at least one irregular jumbo block of the plurality of irregular jumbo blocks to a use outside of the plurality of jumbo blocks.

3. The data storage device of claim 2, wherein the at least one block from the at least one regular jumbo block or the first irregular jumbo block is not a bad block.

4. The data storage device of claim 1, where at least one block from the first irregular jumbo block is from a die that is different from any dies having blocks in the second irregular jumbo block.

5. The data storage device of claim 1, wherein the controller is further configured to select the same number of blocks prior to either of the relinkings.

6. The data storage device of claim 5, wherein the selecting is performed to achieve a predetermined irregular jumbo block performance.

7. The data storage device of claim 1, wherein after relinking the at least one block from the first irregular jumbo block to the second irregular jumbo there are regular jumbo blocks, the first irregular jumbo block, and the second irregular jumbo block, wherein the regular jumbo block has a greater number of blocks than the first same number of blocks.

8. The data storage device of claim 1, wherein the relinking of the at least one block from the at least one regular jumbo block reduces a number of regular jumbo blocks of the plurality of jumbo blocks.

9. The data storage device of claim 1, wherein the controller is further configured to decrease a number of the plurality of irregular jumbo blocks.

10. A data storage device, comprising:
a memory device; and
a controller coupled to the memory device, wherein the controller is configured to:
create a plurality of jumbo blocks, wherein the plurality of jumbo blocks comprises at least one regular jumbo block and a plurality of irregular jumbo blocks, wherein an irregular jumbo block includes a block from less than all dies of the memory device, and wherein a regular jumbo block includes a block from all dies of the memory device;
determine a block size of the plurality jumbo blocks based on a determination that a performance of an irregular jumbo block of the plurality of irregular jumbo blocks is below a threshold; and relink at least one block from a first regular jumbo block of the at least one regular jumbo blocks and at least one block from a first irregular jumbo block of the plurality of irregular jumbo blocks to a second irregular jumbo block of the plurality of irregular jumbo blocks having a performance below the threshold, wherein:

after the relinking, the at least one regular jumbo block, the first irregular jumbo block, and the second irregular jumbo block include a same number of dies; and the relinking increases a size of each irregular jumbo block of the plurality of irregular jumbo blocks.

11. The data storage device of claim 10, wherein the controller is further configured to relink at least one block from the at least one regular jumbo block and the first irregular jumbo block to a third irregular jumbo block of the plurality of irregular jumbo blocks.

12. The data storage device of claim 11, wherein the second irregular jumbo block and the third irregular jumbo block include the same number of dies.

13. The data storage device of claim 10, wherein a number of irregular jumbo blocks remains the same after the relinking.

14. The data storage device of claim 10, wherein blocks of the first irregular jumbo block are from at least two different physical rows.

15. The data storage device of claim 10, wherein a first block of the first irregular jumbo block and a second block from the second irregular jumbo block are from a same physical row of the memory device.

16. The data storage device of claim 10, wherein all blocks of the first irregular jumbo block are from different physical rows of the memory device.

17. A data storage device, comprising:
a means to store data; and
a controller coupled to the means to store data, wherein the controller is configured to:
create a plurality of jumbo blocks, wherein the plurality of jumbo blocks includes at least one regular jumbo block and a plurality of irregular jumbo blocks, wherein an irregular jumbo block includes a block from less than all dies of the means to store data, and wherein a regular jumbo block includes a block from all dies of the means to store data;
eliminate at least one irregular jumbo block of the plurality of irregular jumbo blocks from the plurality of jumbo blocks;
relink at least one block from the following to a remaining plurality of irregular jumbo blocks to create a new plurality of irregular jumbo blocks:
the eliminated at least one irregular jumbo block; and
the remaining plurality of irregular jumbo blocks, wherein after relinking the new plurality of irregular jumbo blocks all include a same number of dies;
determine that a performance of the new plurality of irregular jumbo blocks is below a threshold; and
relink at least one block from at least one regular jumbo block to the new plurality of irregular jumbo blocks based on the determination, wherein:
after the relinking, the at least one regular jumbo block and the new plurality of irregular jumbo blocks include a second same number of dies; and
the relinking increases a size of each irregular jumbo block of the plurality of irregular jumbo blocks.

18. The data storage device of claim 17, wherein a number of the remaining plurality of irregular jumbo blocks is less than a number of the plurality of irregular jumbo blocks.

19. The data storage device of claim 17, wherein after relinking, a total number of regular jumbo blocks of the plurality of jumbo blocks has decreased.

* * * * *